US012680633B2

(12) United States Patent
Tan et al.

(10) Patent No.: US 12,680,633 B2
(45) Date of Patent: Jul. 14, 2026

(54) GROOVE-FREE QUICK-INSERT PIPE CLAMP AND PROCESSING DEVICE THEREOF

(71) Applicant: WEIFANG 100TONG CASTING CO., LTD., Weifang (CN)

(72) Inventors: Yan Tan, Weifang (CN); Yanjun Wang, Weifang (CN)

(73) Assignee: WEIFANG 100TONG CASTING CO., LTD., Weifang (CN)

( * ) Notice: Subject to any disclaimer, the term of this patent is extended or adjusted under 35 U.S.C. 154(b) by 0 days.

(21) Appl. No.: 18/657,830

(22) Filed: May 8, 2024

(65) Prior Publication Data

US 2025/0305600 A1 Oct. 2, 2025

(30) Foreign Application Priority Data

Apr. 2, 2024 (CN) .......................... 202410393301.9

(51) Int. Cl.
  *F16L 17/04* (2006.01)
  *F16L 21/06* (2006.01)
(52) U.S. Cl.
  CPC ............... *F16L 17/04* (2013.01); *F16L 21/06* (2013.01)
(58) Field of Classification Search
  CPC ......... F16L 21/06; F16L 17/04; F16L 17/025; F16L 25/0018
  See application file for complete search history.

(56) References Cited

U.S. PATENT DOCUMENTS

| | | | | |
|---|---|---|---|---|
| 1,651,980 A | | 12/1927 | Teetor | |
| 2,225,208 A | * | 12/1940 | Crickmer | ................ F16L 17/04 |
| 5,911,446 A | * | 6/1999 | McLennan | .............. F16L 17/04 |
| 6,070,914 A | * | 6/2000 | Schmidt | .................. F16L 17/04 |
| 6,170,884 B1 | * | 1/2001 | McLennan | .............. F16L 17/04 |
| 6,502,865 B1 | * | 1/2003 | Steele | ...................... F16L 17/04 |
| 6,851,728 B2 | * | 2/2005 | Minami | ................ F16L 19/086 |
| | | | | 285/383 |
| 9,879,536 B2 | | 1/2018 | Colletti et al. | |

(Continued)

FOREIGN PATENT DOCUMENTS

| | | |
|---|---|---|
| CA | 2001061 C | 4/1993 |
| CA | 3114900 C | 11/2017 |

(Continued)

*Primary Examiner* — Zachary T Dragicevich
(74) *Attorney, Agent, or Firm* — Bayramoglu Law Offices LLC

(57) ABSTRACT

A groove-free quick-insert pipe clamp includes a pipe clamp group which is combined and fixed with each other and is sleeved between butted pipes, an installation cavity arranged inside the pipe clamp group, and a positioning ring which is movably installed in the installation cavity and realizes shrinkage of an inner diameter by deformation. A bevel group matched with each other is arranged between a side wall of the installation cavity and the positioning ring. When the pipe moves away from the pipe clamp group, the side wall of the installation cavity is driven to move relative to the positioning ring, and the side wall of the installation cavity squeezes the positioning ring toward the axial direction of the pipe through the bevel group. The pipe clamp can tightly press the pipe by the positioning ring through deformation of the shrinkage of the diameter of the positioning ring.

5 Claims, 7 Drawing Sheets

(56)     References Cited

U.S. PATENT DOCUMENTS

2008/0001396 A1*  1/2008  Nish ....................... F16L 17/04
2012/0112454 A1*  5/2012  Griggs, III ............. F16L 17/04

FOREIGN PATENT DOCUMENTS

DE        1525673 A1    5/1969
DE        8906748 U1    7/1989
EP        2354614 A1    8/2011

* cited by examiner

GROOVE-FREE QUICK-INSERT PIPE CLAMP AND PROCESSING DEVICE THEREOF

CROSS REFERENCE TO THE RELATED APPLICATIONS

This application is based upon and claims priority to Chinese Patent Application No. 202410393301.9, filed on Apr. 2, 2024, the entire contents of which are incorporated herein by reference.

TECHNICAL FIELD

The present invention relates to the field of pipe clamps, and more particularly, to a groove-free quick-insert pipe clamp and a processing device thereof.

BACKGROUND

The pipe groove connection is a sleeve-type quick connection implemented as follows: after a pipe joint is machined into a circular groove by a special groove rolling machine, a rubber sealing ring is sleeved at the adjacent pipe end, and a split-type clamping piece, a C-type rubber sealing ring, a fastener, and others, are adopted for assembling. It is a complex process for the groove rolling machine to machine the circular groove, and meanwhile, the strength of the end of the pipe rolled by the groove rolling machine will inevitably be damaged. Therefore, it is desirable to develop a groove-free quick-insert pipe clamp, which can be applied to the connection between groove-free pipes.

However, due to the elimination of groove processing, whether the pipe clamp can overcome the axial force exerted by a water pressure on the pipe to prevent the pipe from separating from the pipe clamp has become an important problem in the design of the pipe clamp.

In summary, there are obvious inconveniences and defects in the actual use of the prior art, so it is necessary to improve it.

SUMMARY

In view of the above shortcomings, the objective of the present invention is to provide a groove-free quick-insert pipe clamp and a processing device thereof. The groove-free quick-insert pipe clamp can tightly press a pipe by a positioning ring through deformation of the shrinkage of the diameter of the positioning ring under the generated axial force when the pipe separates from the pipe clamp, so as to realize the braking work. Moreover, the application also provides a processing device for processing the positioning ring to improve the processing efficiency.

In order to achieve the above objective, the present invention provides a groove-free quick-insert pipe clamp, including a pipe clamp group which is combined and fixed with each other and is sleeved between butted pipes, an installation cavity arranged inside the pipe clamp group, and a positioning ring which is movably installed in the installation cavity and realizes shrinkage of an inner diameter by deformation. A bevel group matched with each other is arranged between a side wall of the installation cavity and the positioning ring. When the pipe moves away from the pipe clamp group, the side wall of the installation cavity is driven to move relative to the positioning ring, and the side wall of the installation cavity squeezes the positioning ring toward the axial direction of the pipe through the bevel group.

According to the groove-free quick-insert pipe clamp of the present invention, the positioning ring is a partial ring structure and is provided with a notch configured to absorb the shrinkage of the positioning ring.

According to the groove-free quick-insert pipe clamp of the present invention, an extension portion made of a deformable material is arranged at the notch.

According to the groove-free quick-insert pipe clamp of the present invention, an inner side of the positioning ring attached to the pipes is provided with a texture structure for increasing a friction between the positioning ring and the pipes.

According to the groove-free quick-insert pipe clamp of the present invention, a sealing sleeve for increasing a tightness between the pipes is installed inside the pipe clamp group. The scaling sleeve includes a first lip portion sandwiched between ends of the pipes and a second lip portion corresponding to each of the pipes and arranged on a side of the first lip portion. The second lip portion is attached to an outer wall of an opening end portion of the pipe.

According to the groove-free quick-insert pipe clamp of the present invention, the cross section of the second lip portion is in an arc or an edgefold shape, and the second lip portion is directed toward the first lip portion. When the pipe moves away from the pipe clamp group, the second lip portion is driven to be deformed and press the outer wall of the opening end portion of the pipe.

A processing device for the groove-free quick-insert pipe clamp of the present invention, includes a cutting base, a cutting saw rotatably installed on the cutting base and swinging vertically, and a positioning assembly installed on the cutting base. The positioning assembly includes a fixed base fixedly installed on the cutting base and a rotation base installed on the fixed base and rotatable relative to the fixed base. A positioning protrusion for positioning the positioning ring and a pressing structure for pressing and fixing the positioning ring are arranged on the rotation base. Under the action of a transmission assembly, the rotation base is driven by the swing of the cutting saw to rotate. During the upward swing of the cutting saw, the rotation base is driven to rotate at a predetermined angle. The rotation base rotates in an opposite direction in response to a next upward swing of the cutting saw.

According to the processing device for the groove-free quick-insert pipe clamp of the present invention, the transmission assembly includes a driving shaft configured to connect the cutting saw and the rotation base and a gear ring arranged on the rotation base. Two incomplete gears are arranged on the driving shaft, and one of the two incomplete gears is meshed with the gear ring. The two incomplete gears in a same rotation direction drive the gear ring to rotate in opposite directions.

According to the processing device for the groove-free quick-insert pipe clamp of the present invention, the pressing structure includes a plurality of clamping blocks configured to move radially with the positioning protrusion as the center.

According to the processing device for the groove-free quick-insert pipe clamp of the present invention, a plurality of ratchet teeth are annularly arranged on an end portion of the driving shaft, and a side end of the cutting saw is provided with a tooth-shaped plate which takes a rotation joint as a circular center and is connected to the ratchet teeth.

The present invention provides a groove-free quick-insert pipe clamp, including a pipe clamp group which is combined and fixed with each other and is sleeved between the butted pipes, an installation cavity arranged inside the pipe clamp group, and a positioning ring which is movably installed in the installation cavity and realizes shrinkage of an inner diameter by deformation. The pipe clamp group can be formed by combining at least two sub-pipe clamps with each other. The pipe clamp group is formed by interconnecting two sub-pipe clamps with each other, and each sub-pipe clamp is correspondingly sleeved on an end of one of the butted pipes, and the outer side of each sub-pipe clamp is provided with an earring for fixing. The corresponding earrings cooperate with a thread positioning member (long bolt) to realize the fixed connection between the sub-pipe clamps. A bevel group matched with each other is arranged between a side wall of the installation cavity and the positioning ring. Specifically, the bevel group includes a first bevel arranged on the side wall of the installation cavity and a second bevel arranged on an end face of the positioning ring and having a slope consistent with a slope of the first bevel. The positioning ring is a partial ring structure and is provided with a notch configured to absorb the shrinkage of the positioning ring. After the positioning ring is squeezed to cause the shrinkage of the inner diameter, the size of the notch is reduced.

In the figures, 00—pipe, 1—pipe clamp group, 11—sub-pipe clamp, 12—earring, 2—positioning ring, 21—notch, 22—extension portion, 3—bevel group, 31—first bevel, 32—second bevel, 4—texture structure, 5—sealing sleeve, 50—sleeve body, 51—first lip portion, 52—second lip portion, 61—cutting base, 62—cutting saw, 63—positioning assembly, 631—fixed base, 632—rotation base, 633—positioning protrusion, 634—threaded driving member, 635—avoidance groove, 71—clamping block, 81—gear ring, 82—driving shaft, 821—incomplete gear, 91—ratchet teeth, and 92—tooth-shaped plate.

DETAILED DESCRIPTION OF THE EMBODIMENTS

In order to make the objective, technical solution and advantages of the present invention more clear, the present invention is further described in detail below in combination with the drawings and embodiments. It should be understood that the specific embodiments described herein are only used to explain the present invention and are not used to limit the present invention.

Figure 1:
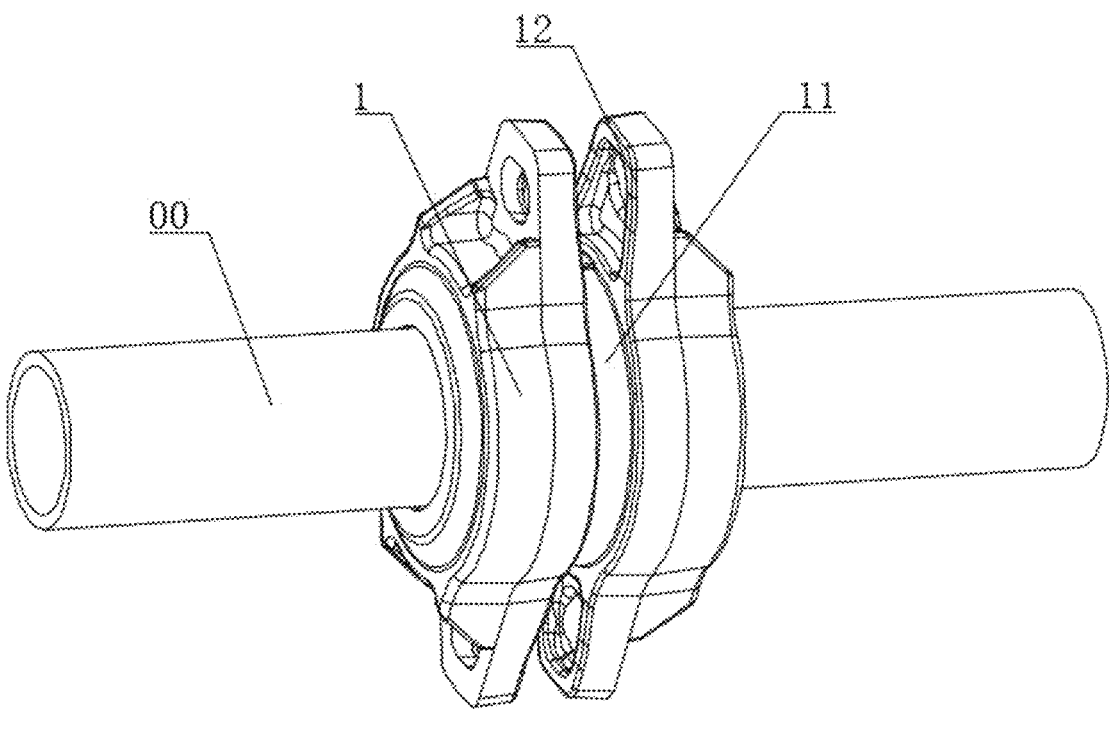
FIG. 1 is a structural schematic diagram of pipes and a pipe clamp group according to the present invention.
Figure 2:
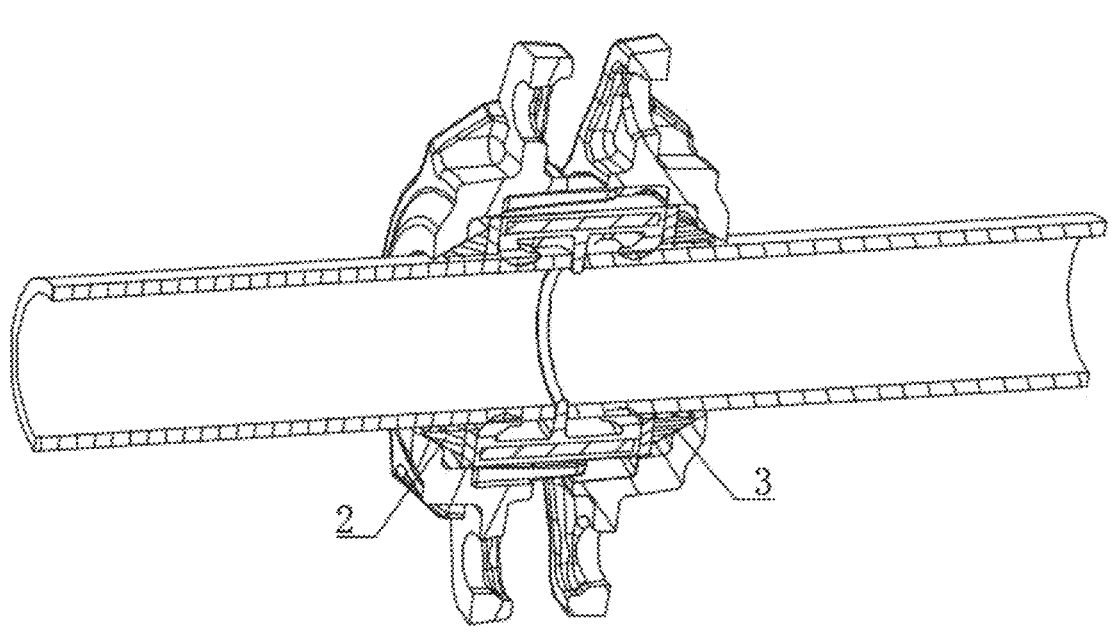
FIG. 2 is a schematic diagram of the internal structure of FIG. 1.
Figure 3:
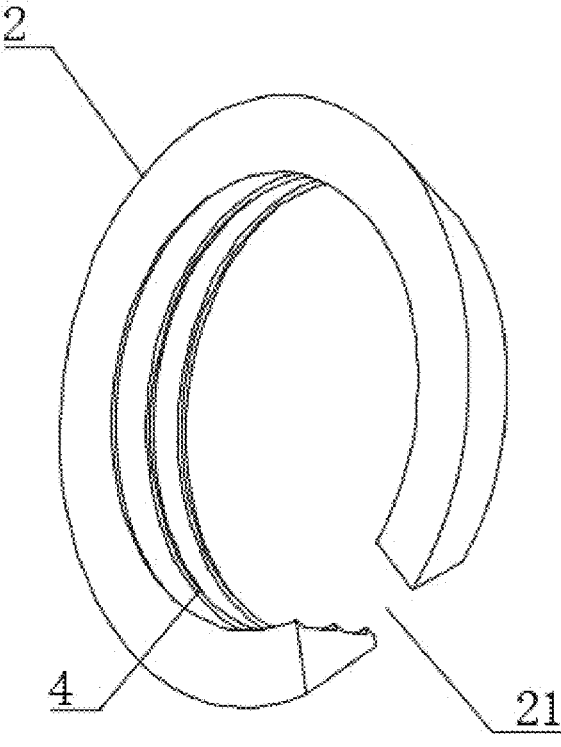
FIG. 3 is a structural schematic diagram of a positioning ring in the first embodiment.

Referring to FIGS. 1 and 2, the present invention provides a groove-free quick-insert pipe clamp and a processing device thereof. The groove-free quick-insert pipe clamp includes the pipe clamp group 1 which is combined and fixed with each other and is sleeved between the butted pipes 00, the installation cavity arranged inside the pipe clamp group 1, and the positioning ring 2 which is movably installed in the installation cavity and realizes shrinkage of an inner diameter by deformation. The pipe clamp group 1 can be formed by combining at least two sub-pipe clamps 11 with each other. In this embodiment, the pipe clamp group 1 is formed by interconnecting two sub-pipe clamps 11 with each other, and each sub-pipe clamp 11 is correspondingly sleeved on an end of one of the butted pipes 00, and the outer side of each sub-pipe clamp 11 is provided with the earring 12 for fixing. The corresponding earrings 12 cooperate with a thread positioning member (such as long bolt, not shown in the figure) to realize the fixed connection between the sub-pipe clamps 11 (the thread positioning member passes through the earrings 12 and uses its end to tightly press the corresponding earrings 12 toward the center for fixing when working).

Referring to FIGS. 2, 3, 5 and 6, the bevel group 3 (shown in FIG. 6) matched with each other is arranged between the side wall of the installation cavity and the positioning ring 2. Specifically, the bevel group 3 includes the first bevel 31 arranged on the side wall of the installation cavity and the second bevel 32 which is arranged on an end face of the positioning ring 2, has a slope consistent with the slope of the first bevel 31, and is attached to the first bevel 31. The positioning ring 2 which realizes shrinkage of the inner diameter adopts the following structure in this embodiment. The positioning ring 2 is a partial ring structure (the material can choose a metal or other material with a certain elastic deformation capacity, such as spring steel) and is provided with the notch 21 (shown in FIG. 3) configured to absorb the shrinkage of the positioning ring 2. After the positioning ring 2 is squeezed (squeezed by the bevel fit, FIG. 6) to cause the shrinkage of the inner diameter, the size of the notch 21 is reduced.

Figure 5:
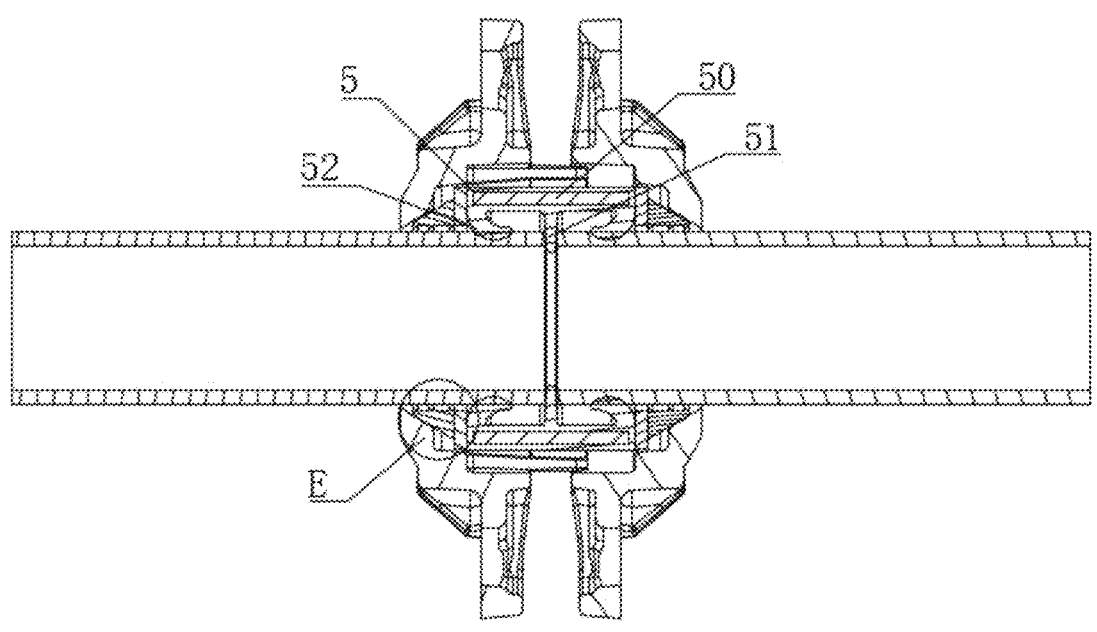
FIG. 5 is a front view of FIG. 2.
Figure 6:
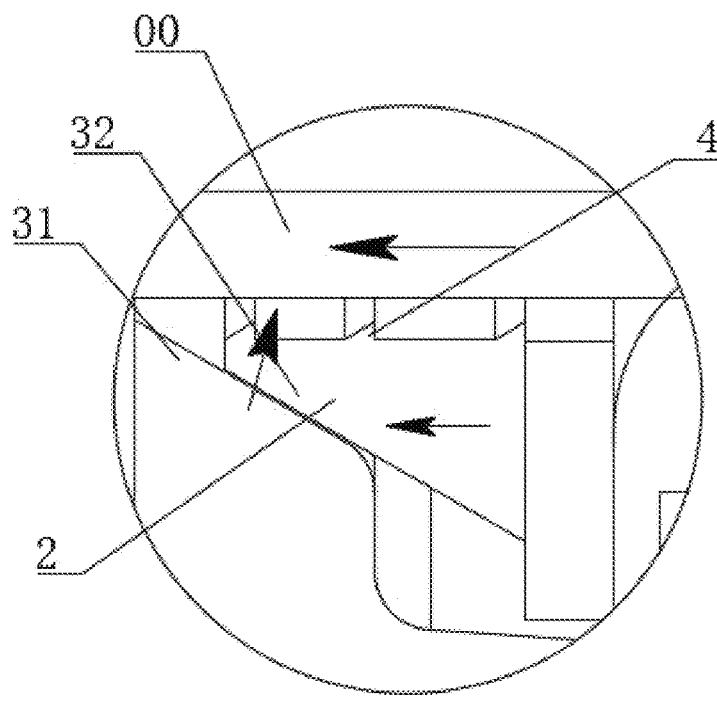
FIG. 6 is an enlarged view of part E circled in FIG. 5.

Referring to FIGS. 5 and 6, when the pipe 00 moves away from the pipe clamp group 1, the side wall of the installation cavity is driven to move relative to the positioning ring 2, and the side wall of the installation cavity squeezes the positioning ring 2 toward the center of the pipe 00 through the bevel group 3 (generating a radial force). After being squeezed, the positioning ring 2 will deform itself, and the specific deformation process is that the notch 21 is reduced and the inner diameter of the positioning ring 2 is reduced. After deformation, the positioning ring 2 further presses the outer wall of the pipe 00, so that the resistance of the bonding surface between the positioning ring 2 and the pipe 00 is finally increased to restrain the movement of the pipe 00.

Moreover, the positioning ring 2 is not limited to the above structure. The positioning ring 2 in the second embodiment can adopt an annular structure prepared by a material with large deformation. The material with large deformation can be rubber, plastic and the like, and the expansion and contraction quantity of the positioning ring 2 during deformation is absorbed by using the shrinkage of the deformable material itself.

Figure 4:
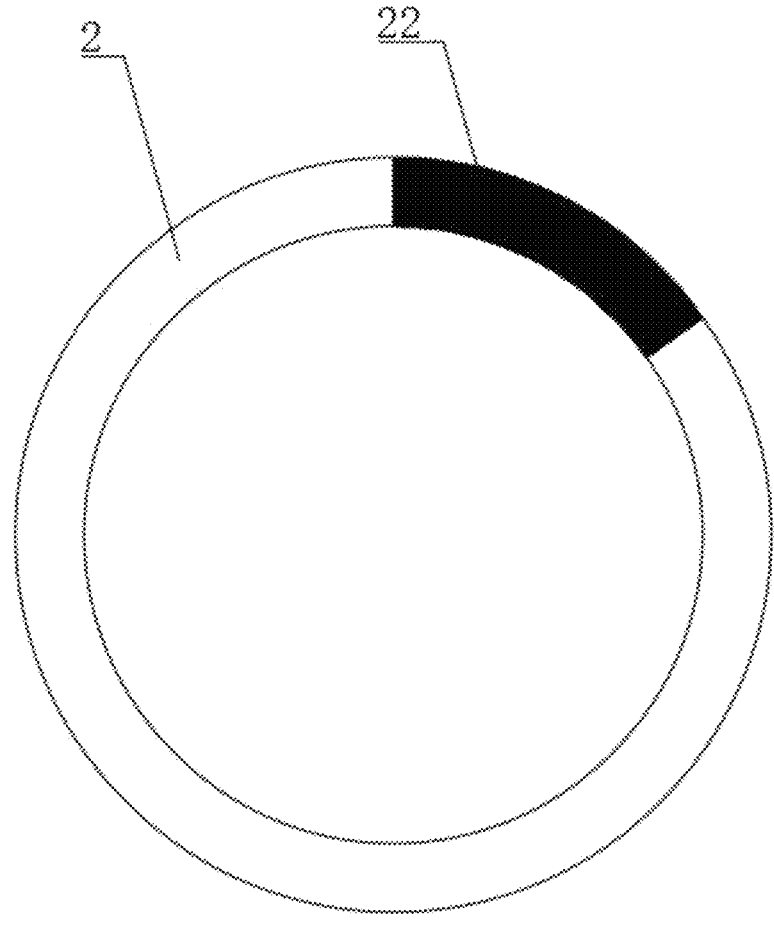
FIG. 4 is a structural schematic diagram of the positioning ring in the third embodiment.

Referring to FIG. 4, in addition, the positioning ring 2 in the third embodiment may adopt a combined structure. For example, on the basis of the first embodiment, an extension portion 22 made of the deformable material (rubber, plastic and the like) is arranged at the notch 21, and the notch 21 is blocked by the extension portion 22, so that the positioning ring 2 is in a complete ring shape to optimize the support effect.

Referring to FIG. 6, preferably, the inner side of the positioning ring 2 attached to the pipes is provided with the texture structure 4 for increasing the friction between the positioning ring 2 and the pipes. The sliding between the positioning ring 2 and the outer wall of the pipe is reduced through the texture structure 4 to further improve the timeliness of the braking work of the positioning ring 2 (to facilitate the positioning ring 2 to move when the pipe 00 moves away from the pipe clamp group 1). The texture structure 4 is a protruding structure and is preferably a protruding structure for braking in one direction, such as a triangular structure with a bevel and a vertical surface (facing the butted end of the pipe) as shown in the figure. Through the above structure, during the installation of the sub-pipe clamp 11, it is convenient for the pipe to be inserted into the sub-pipe clamp 11 (the bevel will reduce its blocking effect on the pipe).

Referring to FIG. 5, the sealing sleeve 5 for increasing the tightness between the pipes is installed inside the pipe clamp group 1.

The sealing sleeve 5 includes the sleeve body 50, the first lip portion 51 sandwiched between the ends of the pipes, and the second lip portion 52 corresponding to each of the pipes and arranged on a side of the first lip portion 51 (in this embodiment, two second lip portions 52 are arranged and correspond to the pipes). The second lip portion 52 is attached to an outer wall of an opening end portion of the pipe. The fitting degree of the openings of the butted pipes is increased by the first lip portion 51 to increase the sealing effect. The second sealing structure is established by attaching the second lip portion 52 to the outer wall of the opening end portion of the pipe (the first scaling structure is the first lip portion 51).

Preferably, the cross section of the second lip portion 52 is in an arc or an edgefold shape, and the second lip portion 52 is directed toward the first lip portion 51. When the pipe 00 moves away from the pipe clamp group 1, the second lip portion 52 is driven to be deformed and press the outer wall of the opening end portion of the pipe, thereby increasing the friction of the contact surface and assisting in braking the pipe 00.

Figure 7:
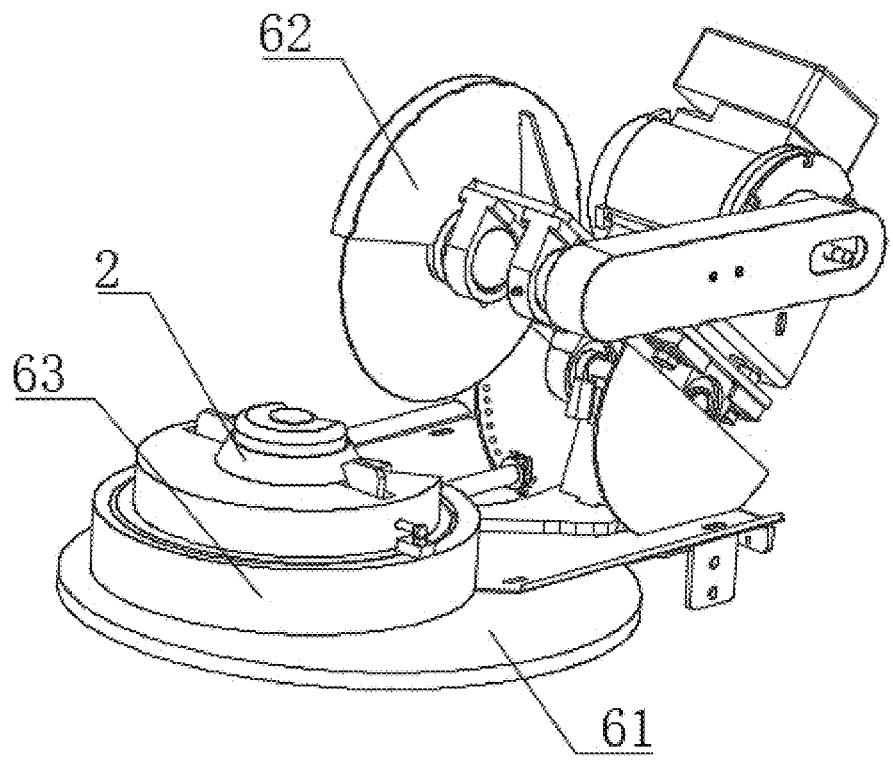
FIG. 7 is a structural schematic diagram of a processing device according to the present invention.
Figure 8:
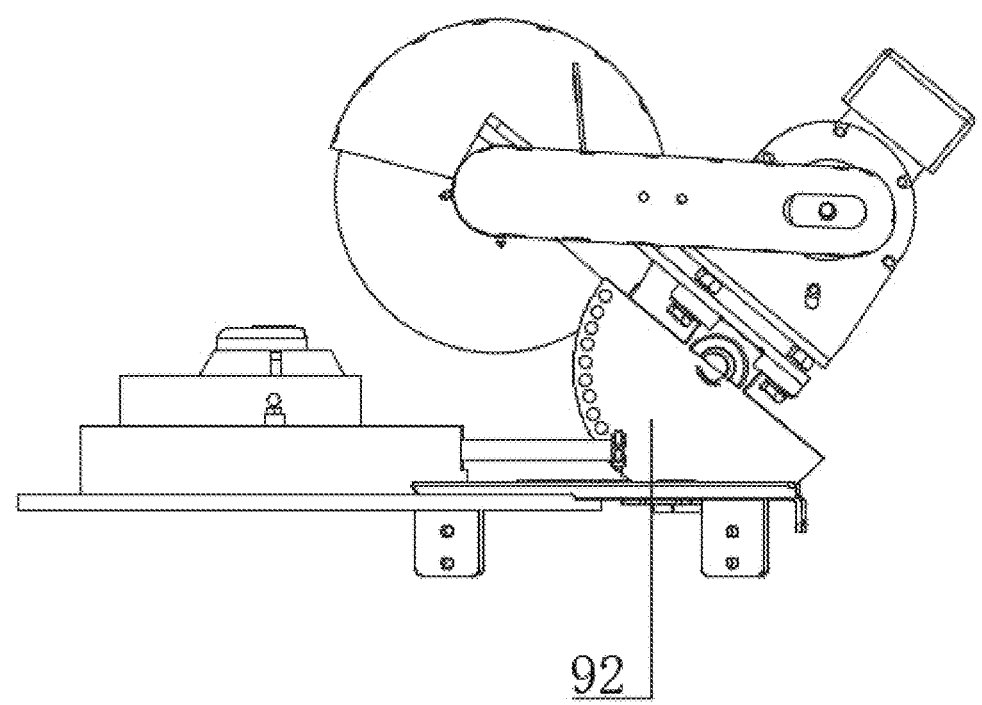
FIG. 8 is a side view of FIG. 7.
Figure 9:
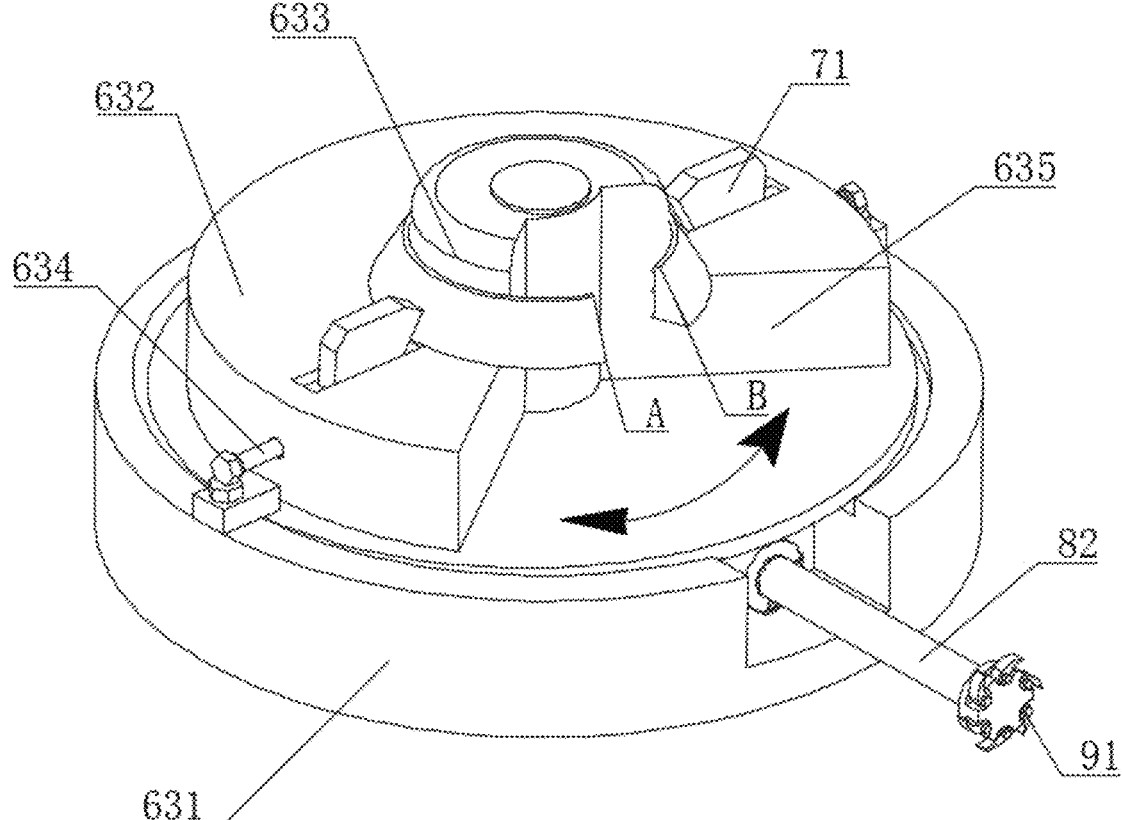
FIG. 9 is an enlarged view of a positioning assembly.

Referring to FIGS. 7 and 8, the present application also provides a processing device for a groove-free quick-insert pipe clamp. The processing device for the groove-free quick-insert pipe clamp is configured to cut the notch 21 of the positioning ring 2, and includes the cutting base 61, the cutting saw 62 rotatably installed on the cutting base 61 and swinging vertically, and the positioning assembly 63 installed on the cutting base 61. The positioning assembly 63 is installed on the cutting base 61 in a detachable manner (fixed by bolts), and the cutting saw 62 swings downward and upward to realize the working process of cutting operation and cutting-canceled operation of the positioning ring 2 placed on the positioning assembly 63.

Referring to FIGS. 9, 10, 11 and 12, the positioning assembly 63 includes the fixed base 631 fixedly installed on the cutting base 61 and the rotation base 632 installed on the fixed base 631 and rotatable relative to the fixed base 631. In this embodiment, both the fixed base 631 and the rotation base 632 are disc-type structures, and can be installed coaxially. The positioning protrusion 633 for positioning the positioning ring 2 and a pressing structure for pressing and fixing the positioning ring 2 are arranged on the rotation base 632. The positioning protrusion 633 is a circular column protrusion, and has a diameter equal to or slightly smaller than the inner diameter of the positioning ring 2. When positioning, the positioning ring 2 is placed outside the positioning protrusion 633, and the outer wall of the positioning ring 2 is tightly pressed by the pressing structure.

Preferably, the rotation base 632 and the positioning protrusion 633 are provided with an avoidance groove 635 for facilitating the cutting saw 62 to cut the workpiece, so as to prevent the cutting saw 62 from cutting the positioning assembly 63.

The pressing structure includes a plurality of clamping blocks 71 configured to move radially with the positioning protrusion 633 as the center, and the driving mode of the clamping blocks 71 is not limited. Specifically, in this embodiment, two clamping blocks 71 are arranged, and the cutting area of the workpiece is located between the two clamping blocks 71. The rotation base 632 is provided with a strip groove. The clamping block 71 is slidably installed in the rotation base 632, and a working end of the clamping block 71 is placed outside the rotation base 632 through the strip groove. The clamping block 71 is driven by manual clamping. Specifically, the side wall of the rotation base 632 is provided with a threaded hole, the threaded driving member 634 (long bolt) is screwed in the threaded hole, and an end of the threaded driving member 634 is rotatably sleeved in the clamping block 71, and the threaded driving member 634 and the clamping block 71 are axially positioned through the positioning structure (annular protrusion), that is, the axial movement of the threaded driving member 634 drives the movement of the clamping block 71 (the driving mode of manual clamping is a common driving mode in the existing tooling field, and is only briefly described since it is not the innovation of the present application). In the clamping process, the threaded driving member 634 is driven to rotate (either by means of a wrench or handheld drive), and under the transmission of the thread structure, the rotation of the threaded driving member 634 is transformed into an axial movement. The axial movement of the threaded driving member 634 drives the clamping block 71 to move, and the working end of the clamping block 71 realizes the working process of clamping the workpiece and clamping-canceled operation.

Under the action of a transmission assembly, the rotation base 632 is driven by the swing of the cutting saw 62 to rotate. The rotation base 632 is driven by the cutting saw 62 to rotate to further adjust the cutting position of the workpiece, and there is no need to manually and actively adjust the rotation direction of the rotation base 632, thereby improving the processing efficiency.

During the upward swing of the cutting saw 62, the rotation base 632 is driven to rotate at a predetermined angle. The rotation base 632 rotates in the opposite direction in response to a next upward swing of the cutting saw 62. For example, after the cutting of the point A of the workpiece is completed by the cutting saw 62, during the upward swing of the cutting saw 62, the rotation base 632 is synchronously driven to rotate to the point B, and the cutting saw 62 swings downward to realize the cutting of the point B of the workpiece. After the cutting of the point B is completed, during the upward swing of the cutting saw 62, the rotation base 632 is synchronously driven to rotate and reset to the point A. By resetting the working condition, on the one hand, the avoidance groove 635 is ensured to correspond to the cutting saw 62, so as to ensure the cutting work and avoid damage to the tooling; on the other hand, the cutting area of the workpiece is always ensured to be located between the clamping blocks 71, so as to prevent the clamping positions of the clamping blocks 71 from affecting the cutting process.

Figure 10:
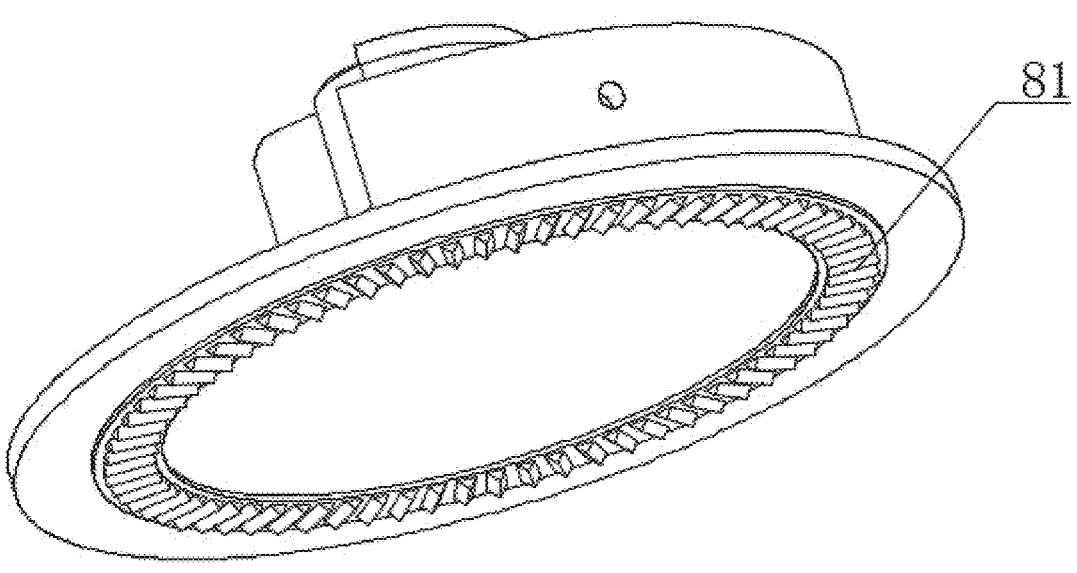
FIG. 10 is a structural schematic diagram of a gear ring on a rotation base.
Figure 11:
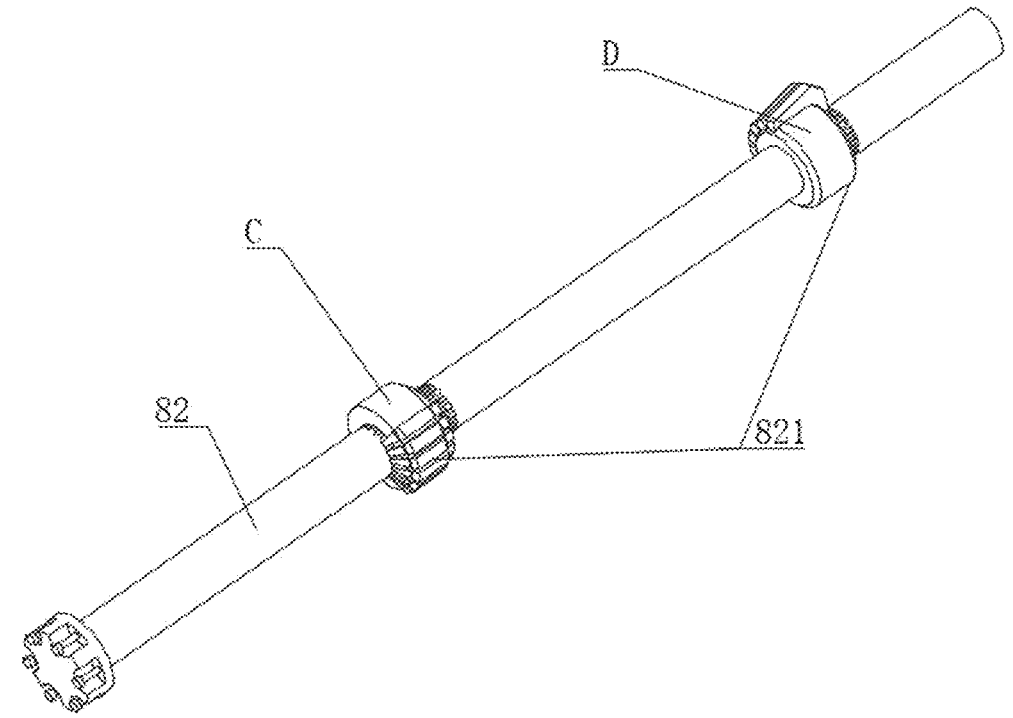
FIG. 11 is a structural schematic diagram of incomplete gears on a driving shaft.

Specifically, the transmission assembly includes the driving shaft 82 configured to connect the cutting saw 62 and the rotation base 632 and the gear ring 81 arranged on the rotation base 632 (FIG. 10). Two incomplete gears 821 (C and D) are arranged on the driving shaft 82, and one of the two incomplete gears 821 is meshed with the gear ring 81 (that is, when the gear C is meshed with the gear ring 81, the gear D is not meshed with the gear ring 81, and vice versa).

Figure 12:
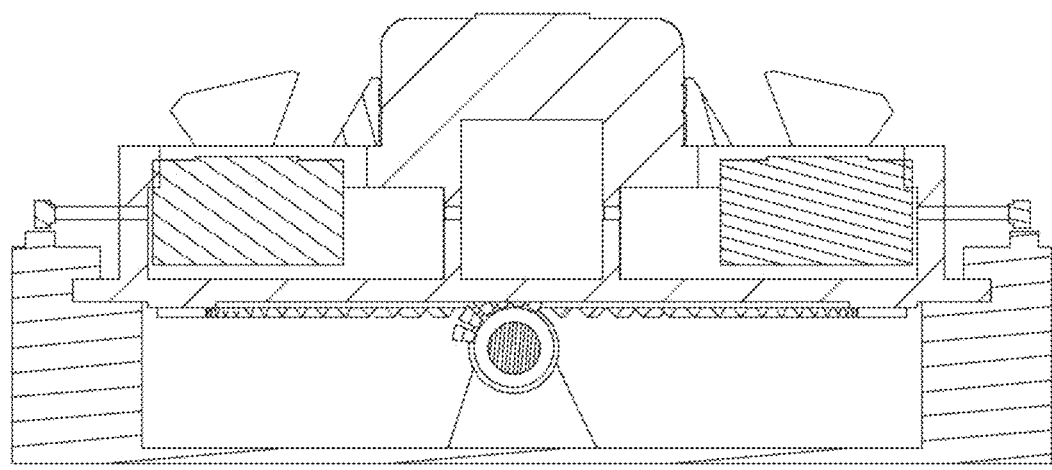
FIG. 12 is a half-sectional view of FIG. 9.

The two incomplete gears 821 in the same rotation direction drive the gear ring 81 to rotate in opposite directions. In this embodiment, the meshing point of the gear C and the gear D is located on a predetermined straight line passing through the center of the gear ring 81 (FIG. 12).

In order to realize that the rotation base 632 is only driven to rotate by the upward swing of the cutting saw 62, a plurality of ratchet teeth 91 are annularly arranged on an end portion of the driving shaft 82. The side end of the cutting saw 62 is provided with a tooth-shaped plate 92 which takes the rotation joint as the circular center and is meshed with the ratchet teeth 91. Specifically, in this embodiment, the tooth-shaped plate 92 is a ¼ circular plate or a semicircular plate, and its outer edge is provided with a gear tooth structure meshed with the ratchet teeth 91. During working, the cutting saw 62 swings upward to drive the tooth-shaped plate 92 to rotate upward, and the ratchet teeth 91 form a transmission with the tooth-shaped plate 92 to further drive the driving shaft 82 to rotate. While the cutting saw 62 swings downward to drive the tooth-shaped plate 92 to rotate downward, in this process, due to the unidirectional transmission of the ratchet teeth 91, the ratchet teeth 91 does not form a transmission with the tooth-shaped plate 92, so that the rotation effect cannot be transferred to the driving shaft 82.

To sum up, the present invention provides a groove-free quick-insert pipe clamp, including a pipe clamp group which is combined and fixed with each other and is sleeved between the butted pipes, an installation cavity arranged inside the pipe clamp group, and a positioning ring which is movably installed in the installation cavity and realizes shrinkage of an inner diameter by deformation. The pipe clamp group can be formed by combining at least two sub-pipe clamps with each other. The pipe clamp group is formed by interconnecting two sub-pipe clamps with each other, and each sub-pipe clamp is correspondingly sleeved on an end of one of the butted pipes, and the outer side of each sub-pipe clamp is provided with an earring for fixing. The corresponding earrings cooperate with a thread positioning member (long bolt) to realize the fixed connection between the sub-pipe clamps. A bevel group matched with each other is arranged between a side wall of the installation cavity and the positioning ring. Specifically, the bevel group includes a first bevel arranged on the side wall of the installation cavity and a second bevel arranged on an end face of the positioning ring and having a slope consistent with a slope of the first bevel. The positioning ring is a partial ring structure and is provided with a notch configured to absorb the shrinkage of the positioning ring. After the positioning ring is squeezed to cause the shrinkage of the inner diameter, the size of the notch is reduced.

Of course, the present invention can also have a variety of other embodiments, and without deviating from the spirit and essence of the present invention, those skilled in the art may make various corresponding changes and modifications according to the present invention. However, these corresponding changes and modifications shall fall within the scope of protection of the claims attached to the present invention.

What is claimed is:

1. A groove-free quick-insert pipe clamp, comprising:

a pipe clamp group, wherein the pipe clamp group comprises at least two sub-pipe clamps, the at least two sub-pipe clamps of the pipe clamp group are combined and fixed with each other and are sleeved between butted pipes, an installation cavity arranged inside the pipe clamp group, and a positioning ring, wherein the positioning ring is movably installed in the installation cavity and realizes reduction of an inner diameter of the positioning ring by deformation;

wherein a bevel group is arranged between a side wall of the installation cavity and the positioning ring; the bevel group comprises a first bevel arranged on the side wall of the installation cavity and a second bevel arranged on an end face of the positioning ring and attached to the first bevel, wherein the first bevel and the second bevel are matched with each other; when a pipe in the butted pipes moves away from the pipe clamp group, the side wall of the installation cavity is driven to move relative to the positioning ring, and the side wall of the installation cavity squeezes the positioning ring in a predetermined angle and in a direction toward an axial center of the pipe through the bevel group;

wherein a sealing sleeve for increasing a tightness between the butted pipes is installed inside the pipe clamp group; and the sealing sleeve comprises a first lip portion sandwiched between ends of the butted pipes and a second lip portion corresponding to each of the butted pipes and arranged on a side of the first lip portion, wherein the second lip portion is attached to an outer wall of an opening end portion of each of the butted pipes.

2. The groove-free quick-insert pipe clamp according to claim 1, wherein the positioning ring is a partial ring structure and is provided with a notch, wherein the notch is configured to absorb the shrinkage of the positioning ring.

3. The groove-free quick-insert pipe clamp according to claim 2, wherein an extension portion made of a deformable material is arranged at the notch.

4. The groove-free quick-insert pipe clamp according to claim 1, wherein an inner side of the positioning ring attached to the butted pipes is provided with a texture structure for increasing a friction between the positioning ring and the butted pipes.

5. The groove-free quick-insert pipe clamp according to claim 1, wherein a cross section of the second lip portion is in an arc shape, and a radial direction of the second lip portion is directed toward the first lip portion; and when the pipe moves away from the pipe clamp group, the second lip portion is driven to be deformed and press the outer wall of the opening end portion of each of the butted pipes.

* * * * *